United States Patent
Woldt et al.

(10) Patent No.: US 8,465,391 B2
(45) Date of Patent: Jun. 18, 2013

(54) DEVICE FOR FASTENING OF A MAGNETIC RING

(75) Inventors: Holger Woldt, Friedrichshafen (DE); Jan-Michael Buck, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 287 days.

(21) Appl. No.: 13/045,713

(22) Filed: Mar. 11, 2011

(65) Prior Publication Data
US 2011/0251016 A1    Oct. 13, 2011

(30) Foreign Application Priority Data
Apr. 13, 2010   (DE) .......................... 10 2010 003 936

(51) Int. Cl.
*F16H 57/08*   (2006.01)

(52) U.S. Cl.
USPC ........................................................ 475/331

(58) Field of Classification Search
USPC ............ 475/331; 324/207.2, 207.21, 207.25, 324/207.22
See application file for complete search history.

(56) References Cited

U.S. PATENT DOCUMENTS

| 6,522,133 | B1 | 2/2003 | Haupt et al. |
| 6,645,119 | B2 * | 11/2003 | Seo ................. 475/331 |
| 2001/0039229 | A1 * | 11/2001 | Sulzmann ........ 475/317 |
| 2005/0026744 | A1 * | 2/2005 | Illerhaus ......... 475/331 |
| 2008/0302629 | A1 | 12/2008 | Haupt et al. |
| 2009/0069141 | A1 | 3/2009 | Ziemer et al. |
| 2009/0280948 | A1 * | 11/2009 | Fuhrer et al. ... 475/331 |
| 2012/0156034 | A1 * | 6/2012 | Sabannavar et al. ...... 416/1 |

FOREIGN PATENT DOCUMENTS

| DE | 198 51 760 A1 | 5/2000 |
| DE | 10 2005 001 832 A1 | 8/2006 |
| DE | 10 2008 000 263 A1 | 12/2008 |
| DE | 10 2007 042 713 A1 | 3/2009 |
| DE | 10 2009 045 138 A1 | 3/2011 |
| JP | 5119047 A * | 5/1993 |

OTHER PUBLICATIONS

Abstract of JP5119047A.*

* cited by examiner

*Primary Examiner* — Roger Pang
(74) *Attorney, Agent, or Firm* — Davis & Bujold, PLLC

(57) ABSTRACT

An arrangement for fastening a magnetic ring onto a transmission component (1) by way of a supporting ring (6) such that the supporting ring (6) is connected, in a rotationally fixed manner, to the transmission component (1) by a bayonet joint.

9 Claims, 3 Drawing Sheets

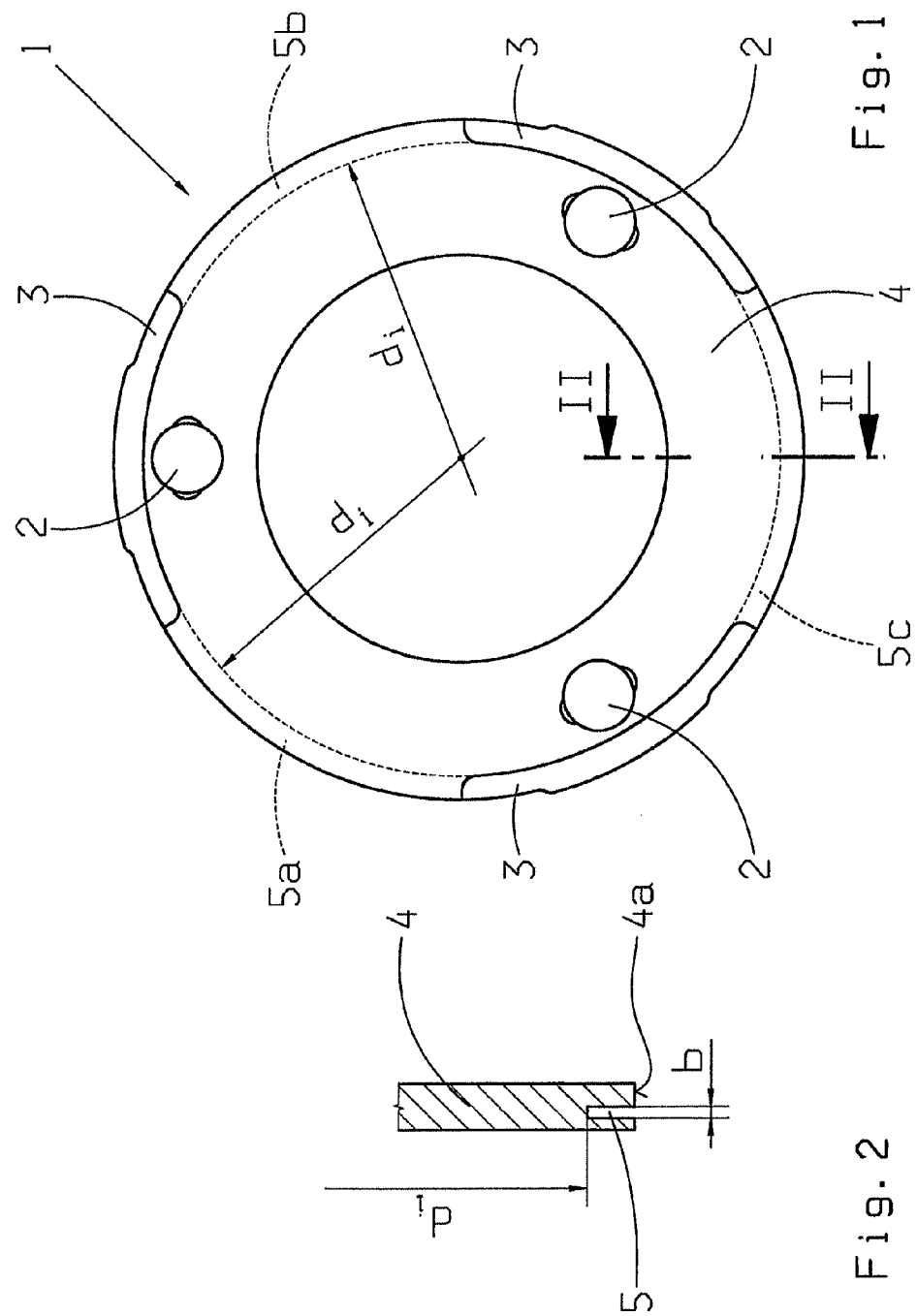

DEVICE FOR FASTENING OF A MAGNETIC RING

This application claims priority from German patent application serial no. 10 2010 003 936.5 filed Apr. 13, 2010.

FIELD OF THE INVENTION

The invention concerns an arrangement for fastening a magnetic ring by means of a supporting ring onto a transmission component, in accordance with the older application with official file number DE 10 2009 045 138.2 by the present applicant.

BACKGROUND OF THE INVENTION

In the older application a supporting ring that holds a magnetic ring is described, which is fixed onto a planetary carrier of a transmission by peening over. By peening over the material of the planetary carrier, holding elements are formed, which engage without play in pockets of the supporting ring thereby producing a rotationally fixed joint between the supporting ring and the planetary carrier. The demands made on this connection between the supporting ring and the planetary carrier are more severe, particularly with regard to alternating loading. In particular, the joint must not be distorted, i.e. no tangential play must appear between the components joined. In that respect there is still a need for improving a joint of this type.

SUMMARY OF THE INVENTION

The purpose of the present invention is to simplify and improve the reliability of the joint between the supporting ring and the transmission component in an arrangement of the type mentioned at the start.

According to the invention, the supporting ring is connected in a rotationally fixed manner to the transmission component by a bayonet joint, i.e. the supporting ring is first placed (inserted) onto the transmission component and then rotated in the circumferential direction. This forms a secure connection which is simple to assemble. It is also advantageous that no additional material costs are entailed and that positive axial securing is obtained. Finally, a further advantage obtained is that the bayonet joint according to the invention is relatively insensitive to temperature effects when the thermal expansion coefficients of the transmission component and the supporting ring are different.

Bayonet joints are a generally known mechanical element and are also known in the field of transmission construction. From DE 10 2008 000 263 A1 by the present applicant a parking lock gearwheel for an automatic transmission is known, such that an outer ring element for increasing the outer diameter of the parking lock gearwheel is mounted onto the parking lock gearwheel, a so-termed bayonet plate ring being used for axial securing. The bayonet plate ring is less a part of a bayonet joint, but rather, serves as an axial securing element in the manner of a circlip.

From DE 10 2005 001 832 A1 by the present applicant a bayonet joint between a diaphragm plate and an oil retainer on a planetary carrier for an automatic transmission is known. On the diaphragm plate are arranged apertures with radial perforations, in which ring segments of the oil retainer engage and form a bayonet joint. The known bayonet joints are not appropriate for the fixing of a magnetic ring.

According to a preferred embodiment, the transmission component has individual ring groove sections on its outer circumference, which are distributed around the circumference with recesses between them. These elements form one half of the bayonet joint, as it were the receiving part into which the other half is inserted and turned. Thus, the recesses provide access to the ring groove sections.

In a further preferred embodiment, the supporting ring has an opening with an inner circumference around which ring segments are distributed, leaving gaps between them. Thus, these elements form the other half of the bayonet joint, i.e. the part which is inserted and turned. The simplicity of the structure is advantageous, since the ring segments can be stamped out of the supporting ring.

In another preferred embodiment the supporting ring is inserted with the ring segments in the recesses of the transmission component and is then turned in the circumferential direction, so that the ring segments are received into the ring groove sections with overlap over a large area. This ensures secure axial fixing of the supporting ring relative to the transmission component.

According to another preferred embodiment, the ring segments also serve to center the supporting ring. For this purpose the inside diameter of the ring segments and the groove bottom diameter of the ring groove sections are sized with tolerances such that a fit, for example a sliding fit is produced. Thus, the two parts of the bayonet joint can be joined easily and are nevertheless centered with respect to one another, which is important for the balanced rotation of the magnetic ring.

In a preferred embodiment, the number of ring segments and ring groove sections is the same as the number of planetary bolts, preferably distributed symmetrically around the circumference. For example if three ring segments and three ring groove sections are provided, the angles they cover are equal to around 60°.

According to a further preferred embodiment, the thickness of the ring segments and the groove width of the ring grooves, in each case in the axial direction, are such that here too a sliding fit (axial play) is provided. This facilitates assembly.

In another preferred embodiment, the supporting ring is fixed by virtue of the ring segments relative to the transmission component in the circumferential direction: this is preferably done by axial compression, whereby the ring segments are clamped within the ring groove sections so that a friction-force-locked joint is formed. This enables simple and rapid fixing. For additional security the ends of the ring groove sections can be pressed down so that closed pockets for the ring segments are formed, which allow no movement in the circumferential direction.

In a further preferred embodiment, the transmission component is in the form of a planetary carrier, which is preferably part of an automatic transmission for motor vehicles. This enables the rotational speed of the planetary carrier (web of the planetary transmission) to be measured.

BRIEF DESCRIPTION OF THE DRAWINGS

An example embodiment of the invention is illustrated in the drawings and described in more detail below; further features and/or advantages can be seen from the description and/or the drawings, which show:

FIG. 1: a view of a planetary carrier, looking in the axial direction,

FIG. 2: a partial section through the planetary carrier, along the plane II-II,

DETAILED DESCRIPTION OF THE PREFERRED EMBODIMENTS

Figure 4:
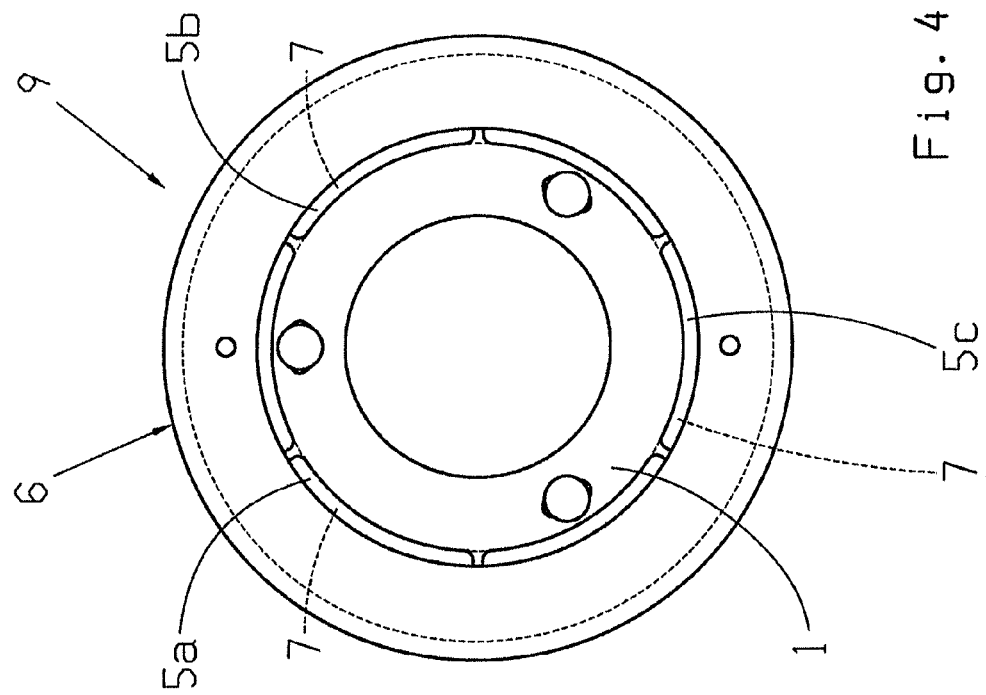
FIG. 4: an assembly of the planetary carrier and supporting ring.

FIG. 1 shows a view of a transmission component in the form of a planetary carrier 1, looking in the axial direction. The planetary carrier 1 has, distributed around its circumference, for example three bores 2 for planetary bolts (not shown). Radially outside the bores 2 are arranged kidney-shaped recesses 3 in a ring plate 4 which is part of the planetary carrier 1. The planetary carrier 1 is made of steel and forms part of an automatic transmission for motor vehicles.

FIG. 2 shows an enlarged partial-section in the plane II-II through the ring plate 4, with an outer circumference 4a. In the outer circumference 4a of the ring plate 4 is machined a ring groove 5 with groove bottom diameter $d_i$ and groove width b. The diameter $d_i$ is shown in FIG. 1 by a broken line and corresponds to the inside diameter of the kidney-shaped recesses 3. The areas of the surrounding ring groove 5 between the kidney-shaped recesses 3 in FIG. 1 are indexed as ring groove sections 5a, 5b, 5c.

In the area of the kidney-shaped recesses 3, also referred to as pockets, the surrounding groove 5 in each case has the groove flank removed at the front, relative to the plane of the drawing.

Figure 3:
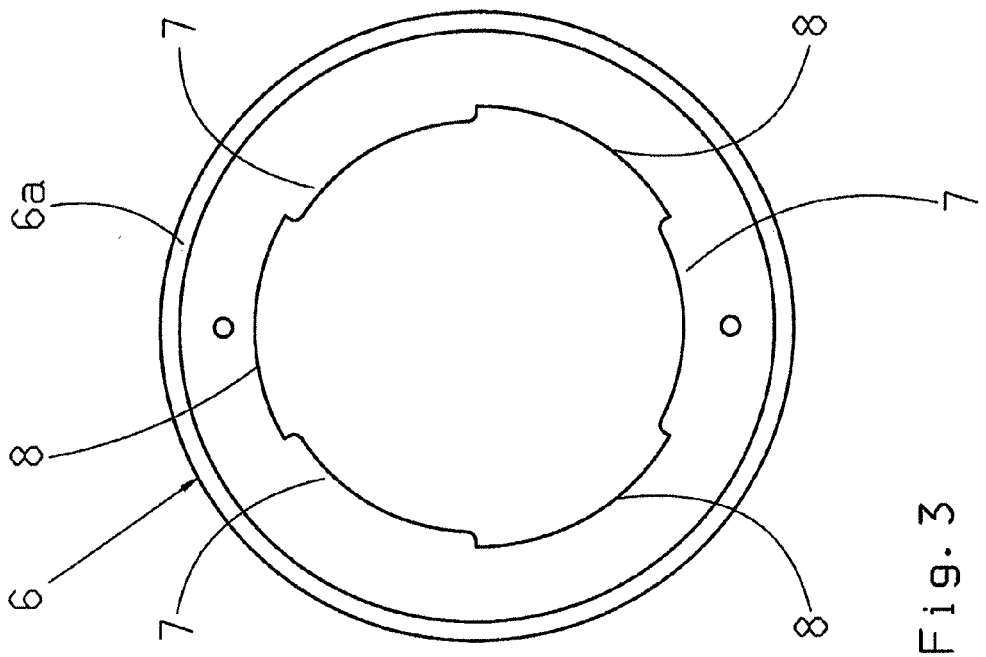
FIG. 3: a supporting ring for a magnetic ring.

FIG. 3 shows a supporting ring 6 which, in its outer circumferential area 6a, holds a magnetic ring (not shown) for rotational speed measurement. The supporting ring 6 with its magnetic ring (not shown) is joined to the planetary carrier 1 (FIG. 1) by a bayonet joint. For this purpose the supporting ring 6 has on its inside circumference three ring segments 7, between which gaps 8 are left. The supporting ring 6 is in the form of a sheet component, for example made of aluminum sheet, with a sheet thickness s that corresponds to the groove width b (FIG. 2). The number—in this case three—of ring segments 7 is determined by the number of planetary bolts, which already take up space as such. To fit on the supporting ring 6, the ring segments 7 are inserted into the kidney-shaped recesses 3 or pockets of the planetary carrier 1 (see FIG. 1) and turned through about 60° in the circumferential direction, so that an axial overlap is formed between the ring segments 7 and the ring groove sections 5a, 5b, 5c.

FIG. 4 shows a ready-assembled structural unit 9 with a planetary carrier 1 and supporting ring 6 connected to one another by a bayonet joint. It can be seen that the ring segments 7, here shown by broken lines, are completely covered by the ring groove sections 5a, 5b, 5c. Consequently there is axial overlap over a large area between the supporting ring 6 and the planetary carrier 1. Once the supporting ring 6 and the planetary carrier 1 have been joined, the two components are fixed in the circumferential direction in the position shown in FIG. 4 and are therefore secured against rotation.

Figure 5:
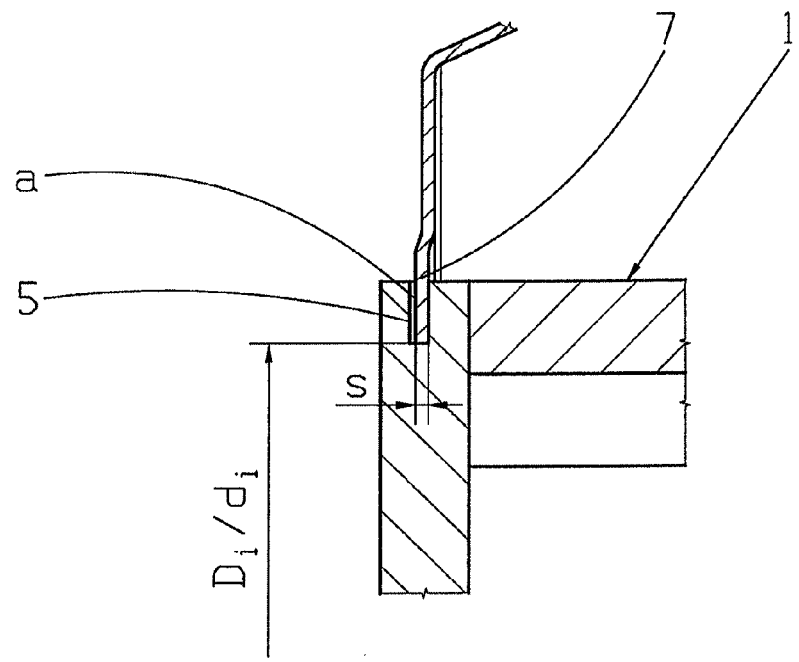
FIG. 5: a partial section through the planetary carrier and the supporting ring in a condition before fixing

FIG. 5 shows an enlarged section in the area of the ring groove 5, which holds a ring segment 7 of sheet thickness s with some axial play a. The ring segments 7 have an inside diameter $D_i$, whereas the groove bottom diameter of the ring groove 5 is indexed $d_i$. The tolerances of the diameters $D_i$ and $d_i$ are chosen such that a suitable fit for the centering of the supporting ring 6 relative to the planetary carrier 1 is obtained.

Figure 6:
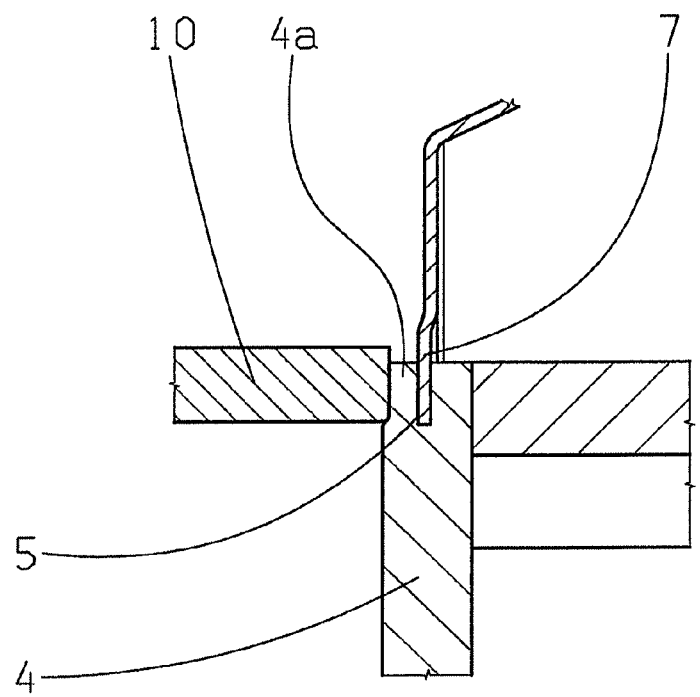
FIG. 6: the same partial section as FIG. 5, with fixing by axial peening over.

FIG. 6 shows the same view as FIG. 5 but without any axial play a. To fix the supporting ring 6 relative to the ring plate 4, the area 4a positioned in front of the ring segment 7 is pressed in—whether point by point or over a stretch—by an axial ram 10, so that the ring segment 7 is held firmly in the ring groove 5 by friction force and is secured in the circumferential direction.

Additional securing against rotation can be achieved by pressing down or closing the ring groove sections 5a, 5b, 5c (see FIG. 4) at their ends, so that additional, shape-enclosed security against rotation is obtained.

The invention claimed is:

1. An arrangement for fastening a magnetic ring, via a supporting ring (6), onto a transmission component (1) such that the supporting ring (6) being connected, in a rotationally fixed manner, to the transmission component (1) by a bayonet joint;
    wherein the transmission component (1) has ring groove sections (5a, 5b, 5c) distributed about its outer circumference (4a) with a recess (3) located between each of the ring groove sections (5a, 5b, 5c);
    the supporting ring (6) has, on an inner circumference, ring segments (7) which are distributed around an inner circumference with a gap (8) provided between each adjacent pair of ring segments (7); and
    the ring segments (7) are secured within the ring groove sections (5a, 5b, 5c) by axial compression which inhibits relative rotation therebetween.

2. The arrangement according to claim 1, wherein the ring segments (7) are insertable, in an axial direction, into the recesses (3) and then the ring segments (7) are rotatable into the ring groove sections (5a, 5b, 5c).

3. The arrangement according to claim 1, wherein the ring segments (7) have an inside diameter (Di) and the ring groove sections (5a, 5b, 5c) have a groove bottom diameter (di), and tolerances are selected for the inside and groove bottom diameters (Di, di) so as to facilitate centering.

4. The arrangement according to claim 1, wherein the ring segments (7) have a sheet thickness (s) and the ring groove sections (5a, 5b, 5c) have a groove width (b), and the groove width (b) of the ring groove sections is greater than the sheet thickness (s) of the ring segments (b>s).

5. The arrangement according to claim 1, wherein a tangential extension of the ring groove sections (5a, 5b, 5c) and a tangential extension of the ring segments (7) are approximately the same, and cover a circumferential angle of approximately 60°.

6. The arrangement according to claim 1, wherein the transmission component (1) is a planetary carrier.

7. The arrangement according to claim 6, wherein the transmission component (1) is a planetary carrier and a number of the ring segments (7) and of the ring groove sections (5a, 5b, 5c) is equal to a number of planetary bolt bores (2) provided in the planetary carrier.

8. The arrangement according to claim 1, wherein the transmission component (1) is component of an automatic transmission for a motor vehicle.

9. An arrangement for fastening a magnetic ring onto a transmission component (1), the arrangement comprising:
    a supporting ring (6) being rotationally fixed to the transmission component (1) by a bayonet joint, and
    the magnetic ring being held by the supporting ring (6);
    wherein the transmission component (1) has ring groove sections (5a, 5b, 5c) distributed about its outer circumference (4a) with a recess (3) located between each adjacent pair of the ring groove sections (5a, 5b, 5c);

the supporting ring (6) has, on an inner circumference, ring segments (7) which are distributed around an inner circumference with a gap (8) provided between each adjacent pair of ring segments (7); and the ring segments (7) are secured within the ring groove sections (5*a*, 5*b*, 5*c*) by axial compression which inhibits relative rotation therebetween.

\* \* \* \* \*